(12) United States Patent
Byun et al.

(10) Patent No.: US 11,336,517 B2
(45) Date of Patent: May 17, 2022

(54) METHOD AND APPARATUS FOR PERFORMING TRANSMISSION

(71) Applicant: LG ELECTRONICS INC., Seoul (KR)

(72) Inventors: Bokyung Byun, Seoul (KR); Seungjune Yi, Seoul (KR); Geumsan Jo, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 16/964,868

(22) PCT Filed: Apr. 2, 2019

(86) PCT No.: PCT/KR2019/003863
§ 371 (c)(1),
(2) Date: Jul. 24, 2020

(87) PCT Pub. No.: WO2019/194528
PCT Pub. Date: Oct. 10, 2019

(65) Prior Publication Data
US 2021/0067409 A1    Mar. 4, 2021

(30) Foreign Application Priority Data
Apr. 3, 2018    (KR) ........................ 10-2018-0038778

(51) Int. Cl.
*H04L 41/0813*    (2022.01)
*H04W 76/27*    (2018.01)
*H04W 28/02*    (2009.01)

(52) U.S. Cl.
CPC ..... *H04L 41/0813* (2013.01); *H04W 28/0252* (2013.01); *H04W 76/27* (2018.02)

(58) Field of Classification Search
CPC .............. H04L 41/0813; H04W 76/27; H04W 28/0252
See application file for complete search history.

(56) References Cited

U.S. PATENT DOCUMENTS

2016/0278138 A1* 9/2016 Chen ..................... H04W 76/11
2018/0083688 A1* 3/2018 Agiwal ................ H04B 7/0697
(Continued)

OTHER PUBLICATIONS

3GPP TSG-RAN WG2 #100, R2-1713773, Reno, USA, Nov. 27-Dec. 1, 2017, Agenda item: 10.2.9, Source: Samsung Title: Remaining issues on suspension to Inactive in MR dual connectivity (Year: 2017).*
(Continued)

*Primary Examiner* — Chi H Pham
*Assistant Examiner* — Weibin Huang
(74) *Attorney, Agent, or Firm* — Lee Hong Degerman Kang & Waimey

(57) ABSTRACT

Provided are a method for performing, by a user equipment (UE), transmission via only a primary path in a wireless communication system, and an apparatus supporting the same. The method may include: configuring a split bearer, which has multiple L2 entities for both a master cell group (MCG) and a secondary cell group (SCG); when the UE transits from a first state to a second state, reconfiguring the primary path of the split bearer autonomously; and performing the transmission via only the primary path of the split bearer, wherein the primary path is related to an L2 entity for the MCG.

15 Claims, 16 Drawing Sheets

(56) References Cited

U.S. PATENT DOCUMENTS

| | | | | |
|---|---|---|---|---|
| 2020/0196232 | A1* | 6/2020 | Drevo | H04W 52/0212 |
| 2020/0196374 | A1* | 6/2020 | Lim | H04W 76/27 |
| 2020/0288338 | A1* | 9/2020 | Freda | H04W 76/19 |
| 2021/0297899 | A1* | 9/2021 | Baek | H04W 80/02 |

OTHER PUBLICATIONS

Samsung, "Remaining issues on suspension to Inactive in MR dual connectivity," 3GPP TSG-RAN WG2 #100, R2-1713773, Nov. 2017, 6 pages.
ZTE Corporation, "SCG configuration handling during resumption/suspension for MR-DC," 3GPP TSG-RAN WG2 #101, R2-1802399, Feb. 2018, 5 pages.
Apple Inc., "RRC state transition", 3GPP TSG-RAN WG2 #101, R2-1802417, Feb. 2018, 5 pages.
Huawei, HiSilicon, "Discussion on the support of SCG SRB for intra-NR DC," 3GPP TSG-RAN WG2 #101, R2-1803241, Feb. 2018, 4 pages.
Qualcomm Incorporated, "SCG failure handling for split bearer," 3GPP TSG-RAN WG2 #101, R2-1803405, Feb. 2018, 6 pages.
3rd Generation Partnership Project (3GPP), "Technical Specification Group Radio Access Network; Evolved Universal Terrestrial Radio Access (E-UTRA); Radio Resource Control (RRC); Protocol Specification," 3GPP TS 36.331 V15.0.1, Jan. 2018, 776 pages.
PCT International Application No. PCT/KR2019/003863, International Search Report dated Jul. 8, 2019, 2 pages.

* cited by examiner

METHOD AND APPARATUS FOR PERFORMING TRANSMISSION

CROSS-REFERENCE TO RELATED APPLICATIONS

This application is the National Stage filing under 35 U.S.C. 371 of International Application No. PCT/KR2019/003863, filed on Apr. 2, 2019, which claims the benefit of earlier filing date and right of priority to Korean Application No. 10-2018-0038778, filed on Apr. 3, 2018, the contents of which are all incorporated by reference herein in their entirety.

BACKGROUND OF THE DISCLOSURE

Field of the Disclosure

The present invention relates to a wireless communication system.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE DISCLOSURE

Technical Objects

Meanwhile, NR supports above 6 GHz access, and above 6 GHz cell has small coverage compared to below 6 GHz. Thus, above 6 GHz cell would be like small cell in LTE, and most UEs are likely to be configured with dual connectivity (DC) while in RRC_CONNECTED. In addition, since the design objective of NR is to allow a UE to stay in "always connected", it is likely that almost UEs except UEs in RRC_CONNECTED would stay in RRC_INACTIVE.

Because the UE in RRC_INACTIVE can move without notification to the network within pre-configured RAN Notification Area (RNA), a validity of stored SCG configuration is not guaranteed when the UE configured with the DC initiates a RRC connection resume procedure. Thus, it has been considered that the UE performs the EN-DC release procedure when the UE configured with EN-DC initiates the RRC connection resume procedure from RRC_INACTIVE. According to 3GPP TS 36.331 V15.0.1, if the UE is resuming an RRC connection, the UE configured with EN-DC performs EN-DC release and releases entire SCG configuration. That is, in accordance with initiating the RRC connection resume procedure, RB configuration (e.g. PDCP, SDAP) may be maintained and entire SCG configuration may be released.

However, since there could be a case that the UE tries to resume in the same cell which commands the UE to move RRC_INACTIVE or the UE stays in area where the SCG configuration is still valid, it is not desirable to always release SCG configuration.

Based on 3GPP TS 36.331 V15.0.1, both the UE and the network keep the UE context including the SCG configuration until the RRC connection resume procedure is initiated by the UE. Therefore, if the data transmission in RRC_INACTIVE is supported in the later release, the network needs to perform a DC release procedure or a RRC connection reconfiguration procedure for bearer type change to MCG bearer to avoid data transmission via SCG RLC bearer. However, the DC release procedure or the RRC connection reconfiguration procedure for bearer type change may cause additional signaling. Otherwise, the UE has to exclude the data transmission via all bearer including SCG RLC bearer in all cases, and this is obviously inefficient. Therefore, a method for reconfiguring a primary path of the split bearer autonomously by the UE and an apparatus supporting the same need to be suggested.

Technical Solutions

One embodiment provides a method for performing, by a user equipment (UE), transmission via only a primary path in a wireless communication system. The method may include: configuring a split bearer, which has multiple L2 entities for both a master cell group (MCG) and a secondary cell group (SCG); when the UE transits from a first state to a second state, reconfiguring the primary path of the split bearer autonomously; and performing the transmission via only the primary path of the split bearer, wherein the primary path is related to an L2 entity for the MCG.

Another embodiment provides a method for receiving, by a base station (BS), a data via only a primary path in a wireless communication system. The method may include: transmitting a message for configuring a split bearer which has multiple L2 entities for both a master cell group (MCG) and a secondary cell group (SCG), to a user equipment (UE); and receiving the data via only the primary path of the split bearer, from the UE, wherein the primary path of the split bearer is reconfigured by the UE autonomously, when a state of the UE is transited from a first state to a second state, and wherein the primary path is related to an L2 entity for the MCG.

Another embodiment provides a processor for a wireless communication device for performing transmission via only a primary path. The processor may be configured to control the wireless communication device to: configure a split bearer, which has multiple L2 entities for both a master cell group (MCG) and a secondary cell group (SCG); when the UE transits from a first state to a second state, reconfigure the primary path of the split bearer autonomously; and perform the transmission via only the primary path of the split bearer, wherein the primary path is related to an L2 entity for the MCG.

Effects of the Disclosure

The UE can reconfigure the primary path autonomously.

DESCRIPTION OF EXEMPLARY EMBODIMENTS

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
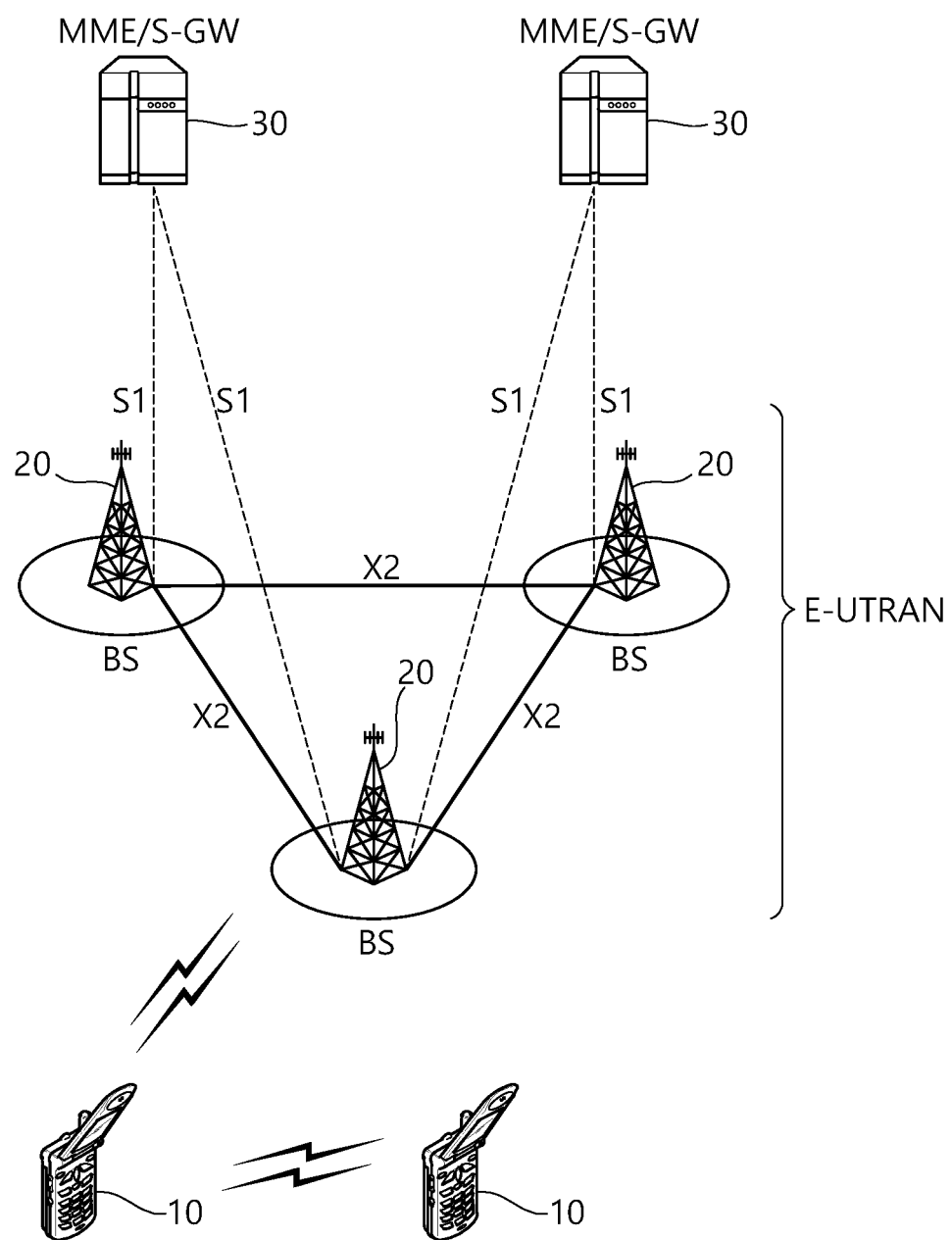
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
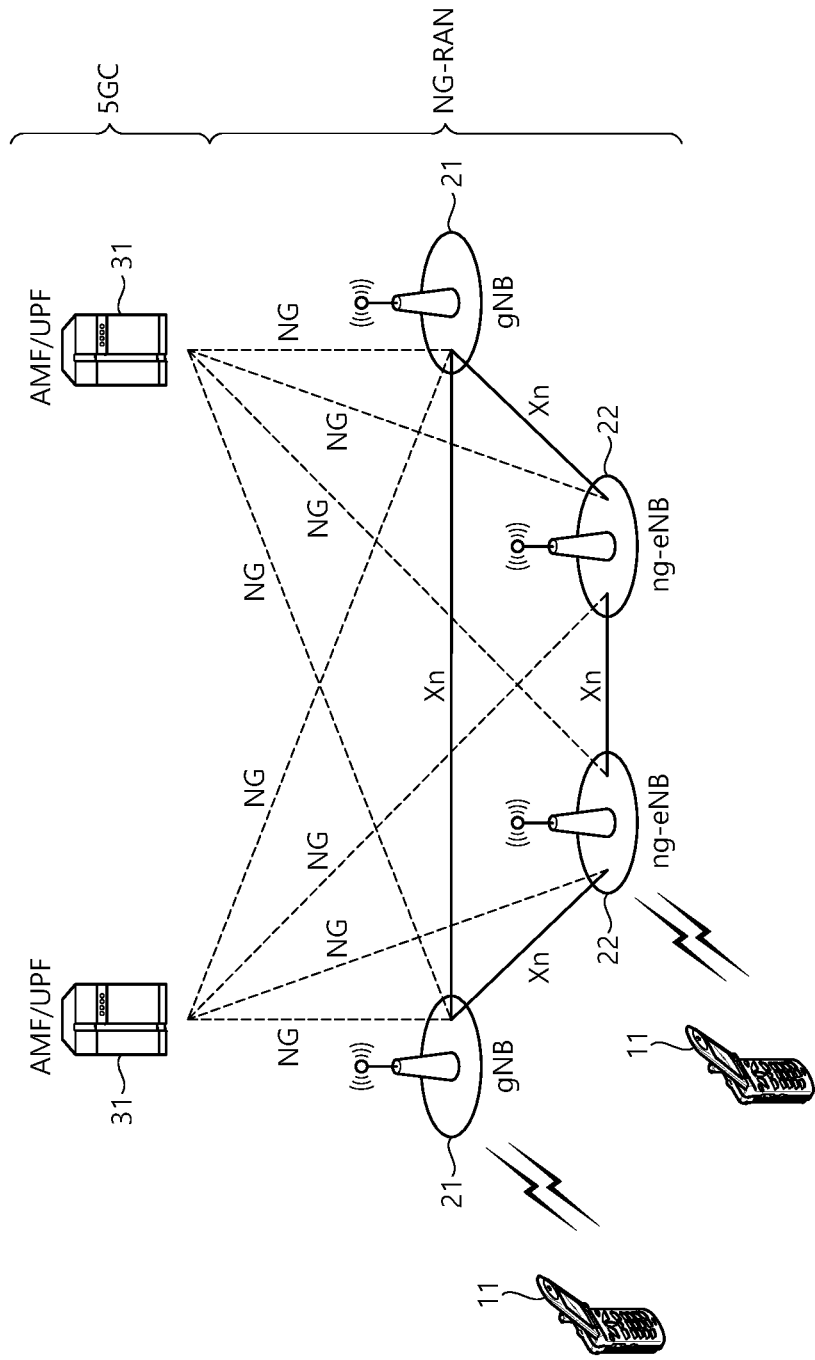
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
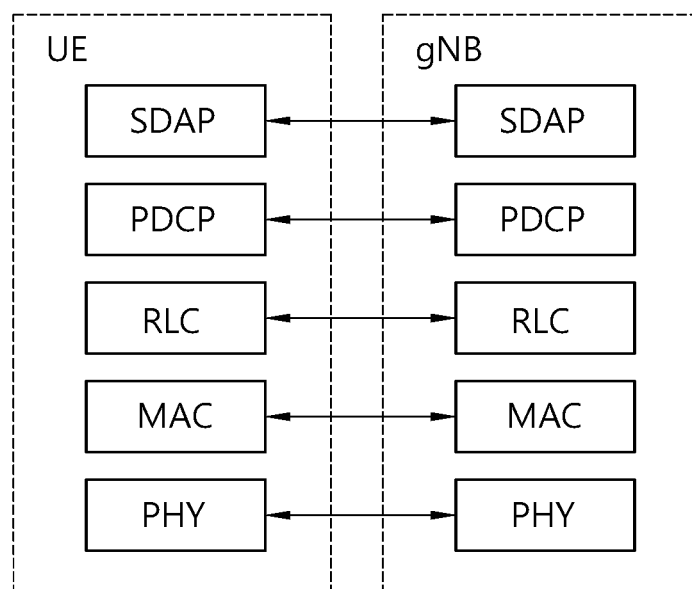
FIG. 3 shows a block diagram of a user plane protocol stack to which technical features of the present invention may be applied.
Figure 4:
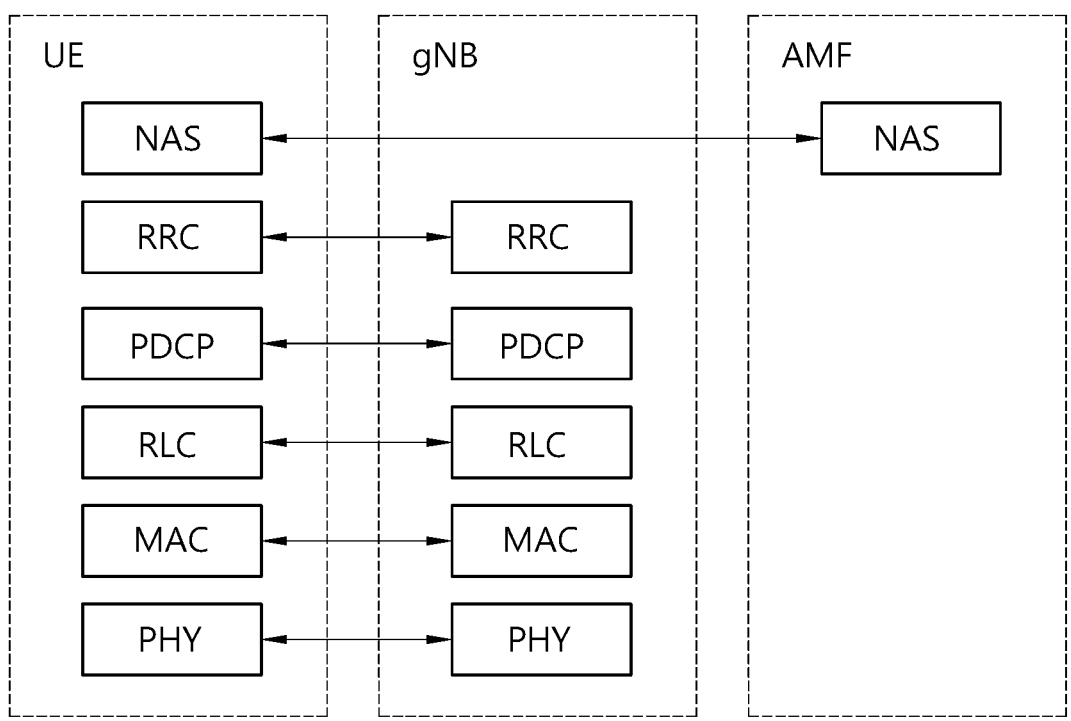
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
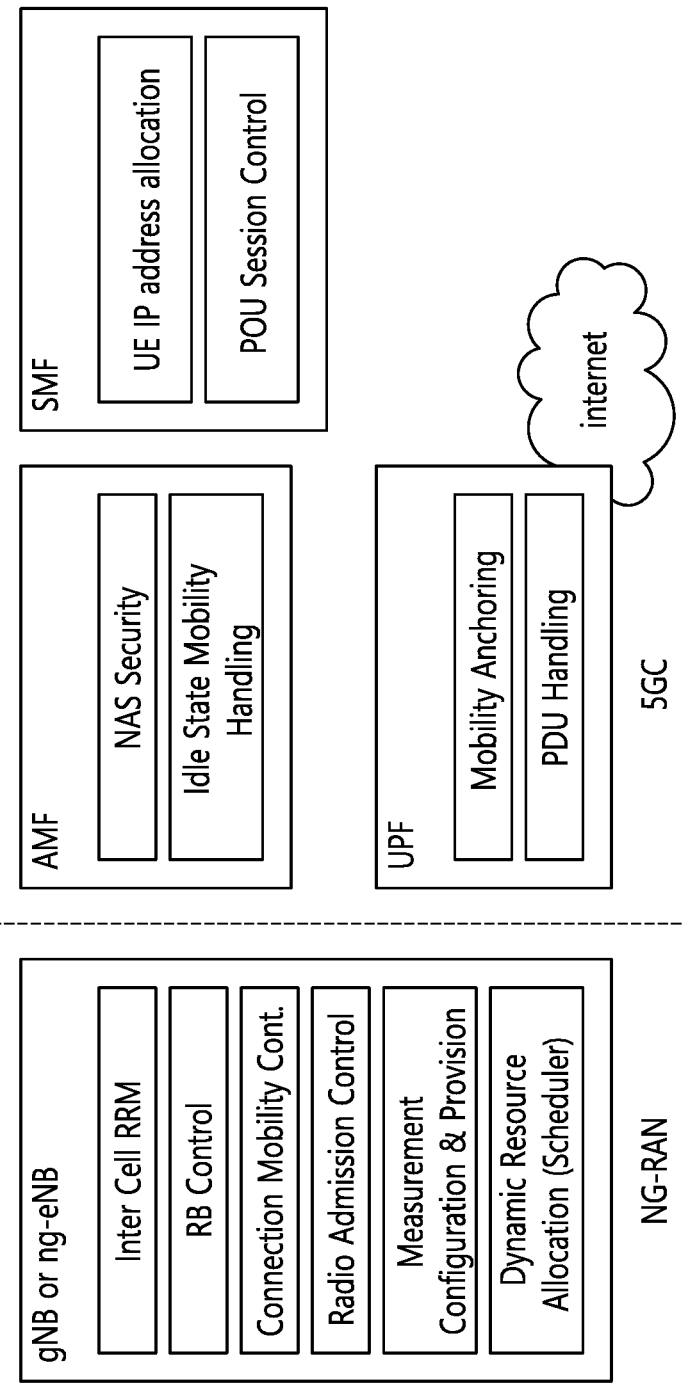
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or O&M);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) may host the following main functions:
- NAS signalling termination;
- NAS signalling security;
- AS Security control;
- Inter CN node signalling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- SMF selection.

The User Plane Function (UPF) may host the following main functions:
- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g. packet filtering, gating, UL/DL rate enforcement;
- Uplink Traffic verification (SDF to QoS flow mapping);
- Downlink packet buffering and downlink data notification triggering.

The Session Management function (SMF) may host the following main functions:
- Session Management;
- UE IP address allocation and management;
- Selection and control of UP function;
- Configures traffic steering at UPF to route traffic to proper destination;
- Control part of policy enforcement and QoS;
- Downlink Data Notification.

Hereinafter, dual connectivity (DC) will be described.

Figure 6:
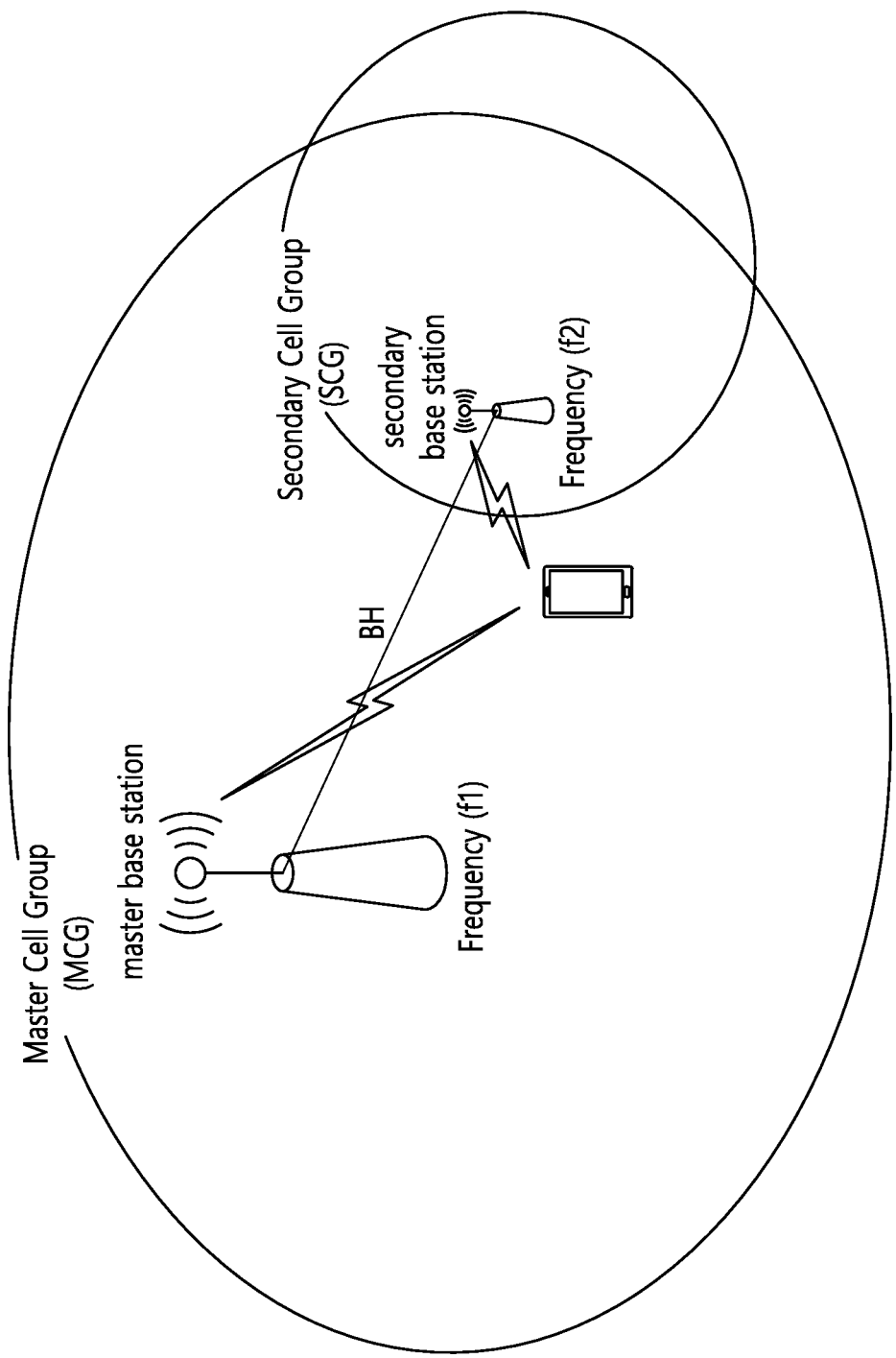
FIG. 6 shows a diagram for dual connectivity between a master cell group (MCG) and a secondary cell group (SCG) to which technical features of the present invention may be applied.

FIG. 6 shows a diagram for dual connectivity between a master cell group (MCG) and a secondary cell group (SCG) to which technical features of the present invention may be applied.

The dual connectivity (DC) means that the UE can be connected to both a master base station and a secondary base station at the same time. For instance, the master base station and the secondary base station may be eNBs. For instance, the master base station and the secondary base station may be gNBs. For instance, the master base station may be an eNB and the secondary base station may be a gNB. For instance, the master base station may be a gNB and the secondary base station may be an eNB. The MCG is a group of serving cells associated with the master base station, comprising of a PCell and optionally one or more SCells. And the SCG is a group of serving cells associated with the secondary base station, comprising of the special SCell and optionally one or more SCells.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the master base station via the frequency of f1, and the SCG is operated by the secondary base station via the frequency of f2. The frequency f1 and f2 may be equal. The backhaul interface (BH) between the master base station and secondary base station is non-ideal (e.g. X2 interface), which means that there is considerable delay in the backhaul and therefore the centralized scheduling in one node is not possible.

For SCG, the following principles are applied: i) at least one cell in SCG has a configured UL CC and one of them, named PSCell, is configured with PUCCH resources; ii) RRC connection Re-establishment procedure is not triggered; iii) for split bearers, the DL data transfer over the master base station is maintained; iv) PSCell cannot be de-activated; and v) PSCell can only be changed with SCG change (i.e. with security key change and RACH procedure).

With respect to the interaction between the master base station and the secondary base station, the following principles are applied: i) the master base station maintains the RRM measurement configuration of the UE and may, e.g., based on received measurement reports or traffic conditions or bearer types, decide to ask the secondary base station to provide additional resources (serving cells) for a UE; ii) upon receiving the request from the master base station, the secondary base station may create the container that will result in the configuration of additional serving cells for the UE (or decide that it has no resource available to do so); iii) for UE capability coordination, the master base station provides (part of) the AS configuration and the UE capabilities to the secondary base station; iv) the master base station and the secondary base station exchange information about UE configuration by means of RRC containers (inter-node messages) carried in X2 messages; v) the secondary base station may initiate a reconfiguration of its existing serving cells (e.g., PUCCH towards the secondary base station); vi) the secondary base station decides which cell is the PSCell within the SCG; and vii) the master base station does not change the content of the RRC configuration provided by the secondary base station.

Figure 7:
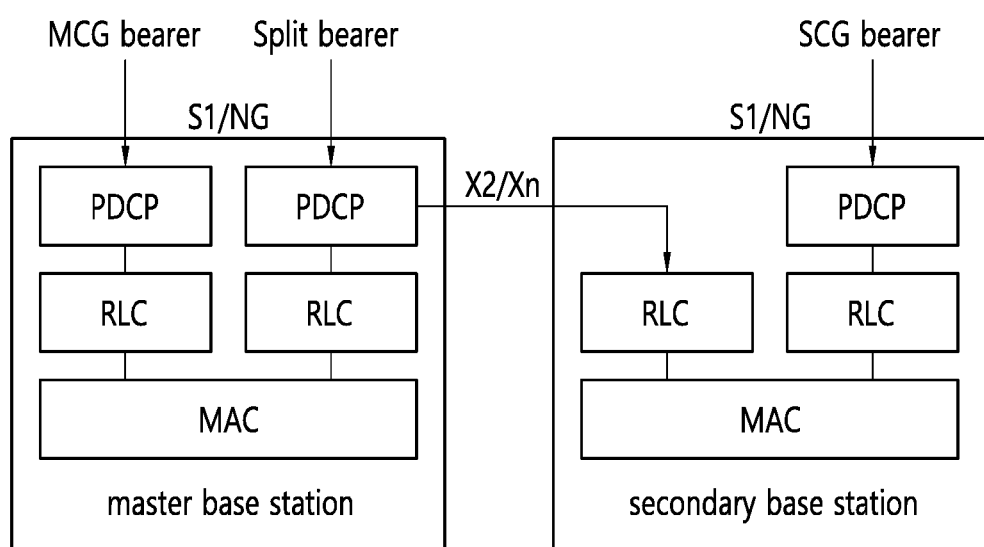
FIG. 7 shows a diagram for radio protocol architecture for dual connectivity to which technical features of the present invention may be applied.

FIG. 7 shows a diagram for radio protocol architecture for dual connectivity to which technical features of the present invention may be applied.

In the dual connectivity operation, the radio protocol architecture that a particular bearer uses depends on how the bearer is setup. Three alternatives exist, MCG bearer, split bearer and SCG bearer. Those three alternatives are depicted on FIG. 7. The SRBs (Signaling Radio Bearers) are always of the MCG bearer and therefore only use the radio resources provided by the master base station. The MCG bearer is a radio protocol only located in the master base station to use master base station resources only in the dual connectivity. And the SCG bearer is a radio protocol only located in the secondary base station to use secondary base station resources in the dual connectivity.

Specially, the split bearer is a radio protocol located in both the master base station and the secondary base station to use both master base station and secondary base station resources in the dual connectivity and the split bearer may be a radio bearer comprising one Packet Data Convergence Protocol (PDCP) entity, two Radio Link Control (RLC) entities and two Medium Access Control (MAC) entities for one direction.

Meanwhile, NR supports above 6 GHz access, and above 6 GHz cell has small coverage compared to below 6 GHz. Thus, above 6 GHz cell would be like small cell in LTE, and most UEs are likely to be configured with dual connectivity (DC) while in RRC_CONNECTED. In addition, since the design objective of NR is to allow a UE to stay in "always connected", it is likely that almost UEs except UEs in RRC_CONNECTED would stay in RRC_INACTIVE.

Because the UE in RRC_INACTIVE can move without notification to the network within pre-configured RAN Notification Area (RNA), a validity of stored SCG configuration is not guaranteed when the UE configured with the DC initiates a RRC connection resume procedure. Thus, it has been considered that the UE performs the EN-DC release procedure when the UE configured with EN-DC initiates the RRC connection resume procedure from RRC_INACTIVE. According to 3GPP TS 36.331 V15.0.1, if the UE is resuming an RRC connection, the UE configured with EN-DC performs EN-DC release and releases entire SCG configuration. That is, in accordance with initiating the RRC connection resume procedure, RB configuration (e.g. PDCP, SDAP) may be maintained and entire SCG configuration may be released.

However, since there could be a case that the UE tries to resume in the same cell which commands the UE to move RRC_INACTIVE or the UE stays in area where the SCG configuration is still valid, it is not desirable to always release SCG configuration.

Based on 3GPP TS 36.331 V15.0.1, both the UE and the network keep the UE context including the SCG configuration until the RRC connection resume procedure is initiated by the UE. Therefore, if the data transmission in RRC_INACTIVE is supported in the later release, the network needs to perform a DC release procedure or a RRC connection reconfiguration procedure for bearer type change to MCG bearer to avoid data transmission via SCG RLC bearer. However, the DC release procedure or the RRC connection reconfiguration procedure for bearer type change may cause additional signaling. Otherwise, the UE has to exclude the data transmission via all bearer including SCG RLC bearer in all cases, and this is obviously inefficient. Therefore, a method for reconfiguring a primary path of the split bearer autonomously by the UE and an apparatus supporting the same need to be suggested.

Hereinafter, according to an embodiment of the present invention, a method for reconfiguring a primary path of the split bearer autonomously by the UE and an apparatus supporting the same will be described.

According to an embodiment of the present invention, the UE may reconfigure split bearer(s) autonomously according to a state transition. For instance, when the UE moves to RRC_INACTIVE, the UE may reconfigure split bearer(s) to enable uplink data transmission only via the MCG RLC entity. On the other hand, when the UE moves to RRC_CONNECTED from RRC_INACTIVE, the UE may reconfigure split bearer(s) to enable uplink data transmission via both MCG RLC and SCG RLC entity or with previous configuration.

Figure 8:
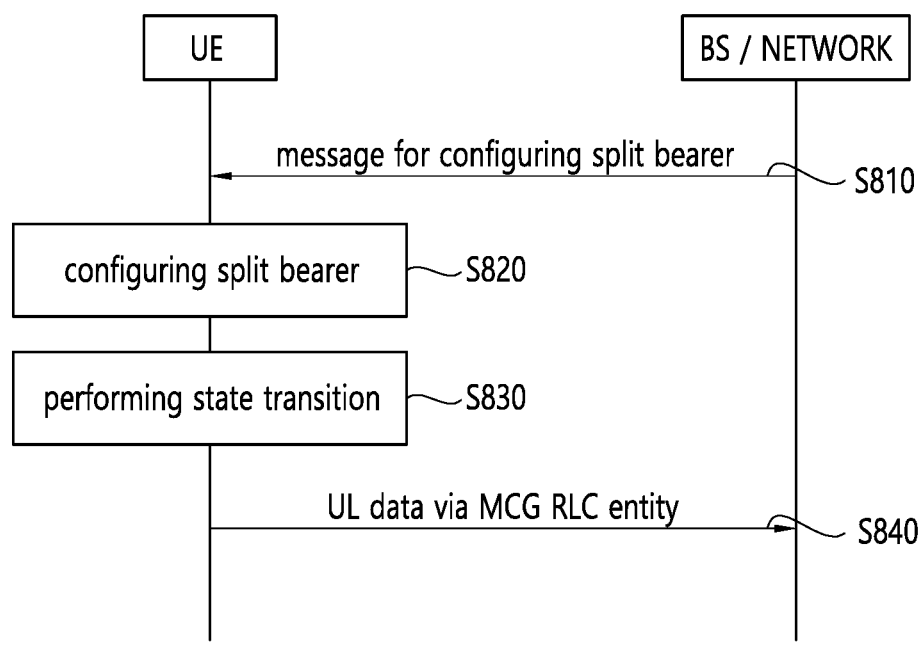
FIG. 8 shows a procedure for reconfiguring split bearer(s) to enable uplink data transmission only via the MCG RLC entity according to an embodiment of the present invention.

FIG. 8 shows a procedure for reconfiguring split bearer(s) to enable uplink data transmission only via the MCG RLC entity according to an embodiment of the present invention.

Referring to FIG. 8, in step S810, the UE may receive a message configuring split bearer establishment and/or modification from a base station. For instance, the message may be a RRC message. For instance, the UE may be in RRC_CONNECTED. The message may include at least one of following:

PDCP configuration located in a master node (MN) or a secondary node (SN), and/or
RLC bearer configurations including the RLC and logical channel configurations for MCG, and/or RLC bearer configurations including RLC and logical channel configurations for SCG, and/or
'UL data split threshold' which indicates the threshold value for uplink data split operation, and/or
'UL data split DRB via SCG' which indicates whether the UE shall send PDCP PDUs via SCG or not, and/or
'Primary Path' which indicates the primary RLC entity for UL data transmission.

Both 'UL data split DRB via SCG' in LTE and 'Primary Path' in NR are used for indicating to which RLC entity the PDCP PDU should be sent in the split bearer. Hence, in this specification, 'UL data split DRB via SCG' and 'Primary Path' may be used in similar meaning.

E-UTRAN only configures the 'UL data split threshold' field for split DRBs.

E-UTRAN only configures the 'UL data split DRB via SCG' field (i.e. indicates value TRUE) for split DRBs. For PDCP duplication, if the 'UL data split DRB via SCG' field is set to TRUE, the primary RLC entity is SCG RLC entity and the secondary RLC entity is MCG RLC entity. If the 'UL data split DRB via SCG' field is not configured or set to FALSE, the primary RLC entity is MCG RLC entity and the secondary RLC entity is SCG RLC entity.

Hereinafter, 'UL data split threshold' may be referred to as a split threshold. Also, 'UL data split DRB via SCG' and 'Primary Path' may be referred to as a primary path.

In step S820, the UE may configure the split bearer based on the received message. Configuring the split bearer may include establishment of that split bearer and/or modification of the split bearer. The UE may transmit data to only the primary RLC entity, or either the primary RLC entity or the secondary RLC entity depending on the PDCP data volume and the split threshold, as follows:

If the total amount of PDCP data volume and RLC data volume pending for initial transmission in the two associated RLC entities is less than the split threshold, the UE may submit the PDCP Data PDU to the primary RLC entity.

Else, the UE may submit the PDCP Data PDU to either the primary RLC entity or the secondary RLC entity.

In step S830, the UE may perform state transition. For instance, the UE may receive a message (e.g. RRC connection release message) which commands the state transition to RRC_INACTIVE via SRB1, and the UE may transit to RRC_INACTIVE. In order to prevent transmitting the data to the SCG RLC entity of the split bearers during RRC_INACTIVE, even though the SCG RLC entity was configured as the primary RLC entity, the UE may perform:

to set 'Primary Path' of split bearer to MCG RLC entity, and/or
to set 'UL data split DRB via SCG' of split bearer to FALSE, and/or
to set an indication of the path for data transmission in RRC_INACTIVE as MCG RLC entity, and/or
to change operation of split bearer to non-split bearer.

Based on the above UE operation, it is possible to prevent the UE from transmitting the data to the SCG RLC entity of the split bearers during RRC_INACTIVE.

The UE in RRC_INACTIVE may ignore the split threshold for decision of the transmission path for data transmission without RRC state transition.

When the UL data is generated in RRC_INACTIVE and the UE decides to transmit the data without RRC state transition, based on the above configuration, the UE may suspend SCG RLC entity and/or submit the PDCP PDU to MCG RLC entity.

In step S840, The UE in RRC_INACTIVE may transmit UL data(s) via MCG RLC entity to the base station.

When the UE receives the RRC connection resume kind of message via SRB1 in response to RRC connection resume request kind of message via SRB0 for resuming RRC connection, the UE may:

resume SRB2 and all DRBs, and/or enter RRC_CONNECTED, and/or restore the previous configuration used in RRC_CONNECTED, e.g., 'UL data split DRB via SCG' and/or 'Primary Path' of split bearers, and/or (re-)configure the split bearers according to the RRC message based on the stored UE AS context, and/or activate duplication of split bearer.

According to an embodiment of the present invention, RRC_INACTIVE may include at least one of INACTIVE state in NR, lightweight connection in LTE, IDLE with suspension, and/or INACTIVE state in eLTE (LTE connectivity to 5G-CN). Uplink data transmission can be performed without RRC signalling in RRC_INACTIVE and without UE initiating transition to RRC_CONNECTED or with RRC signalling in RRC_INACTIVE with/without transition to RRC_CONNECTED. In addition, MN and SN configured with DC have at least combination of NR and NR, E-UTRAN and E-UTRAN, NR and E-UTRAN, or E-UTRAN and NR.

According to an embodiment of the present invention, the UE can reconfigure the primary path autonomously so that the uplink transmission can be performed via only the MCG RLC entity without the signalling overhead.

Figure 9:
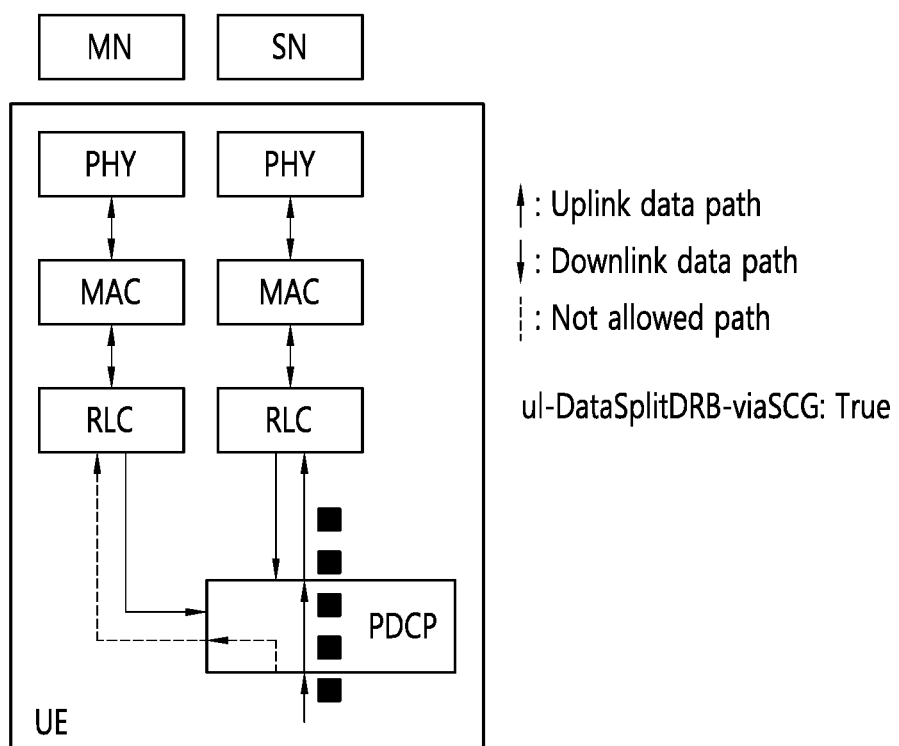
FIG. 9 to FIG. 11 show an example for reconfiguring split bearer(s) to enable uplink data transmission only via the MCG RLC entity according to an embodiment of the present invention.
Figure 10:
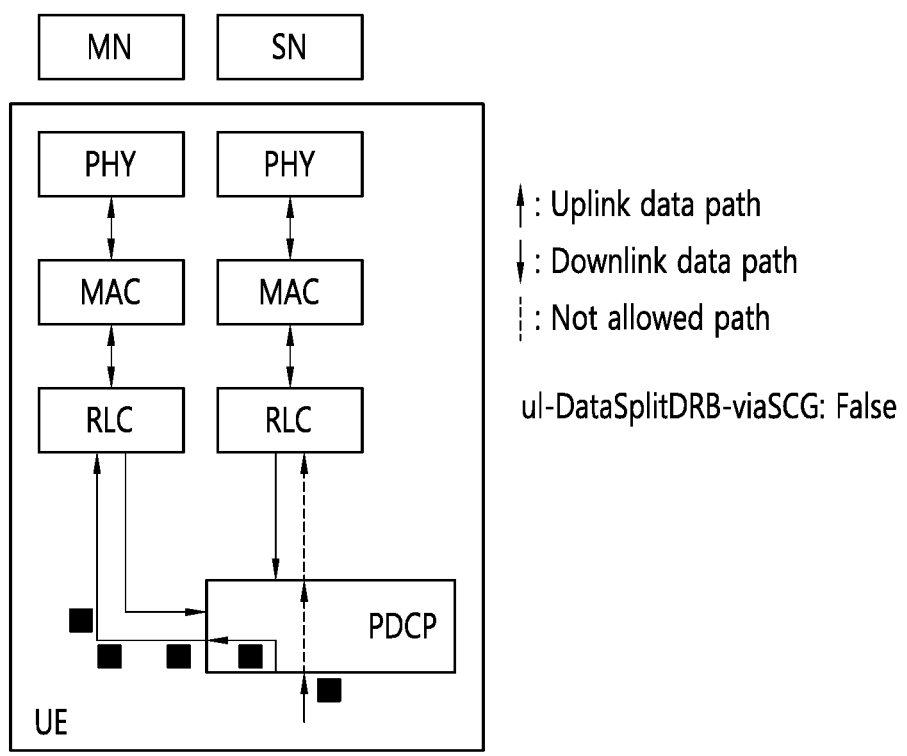
Figure 11:
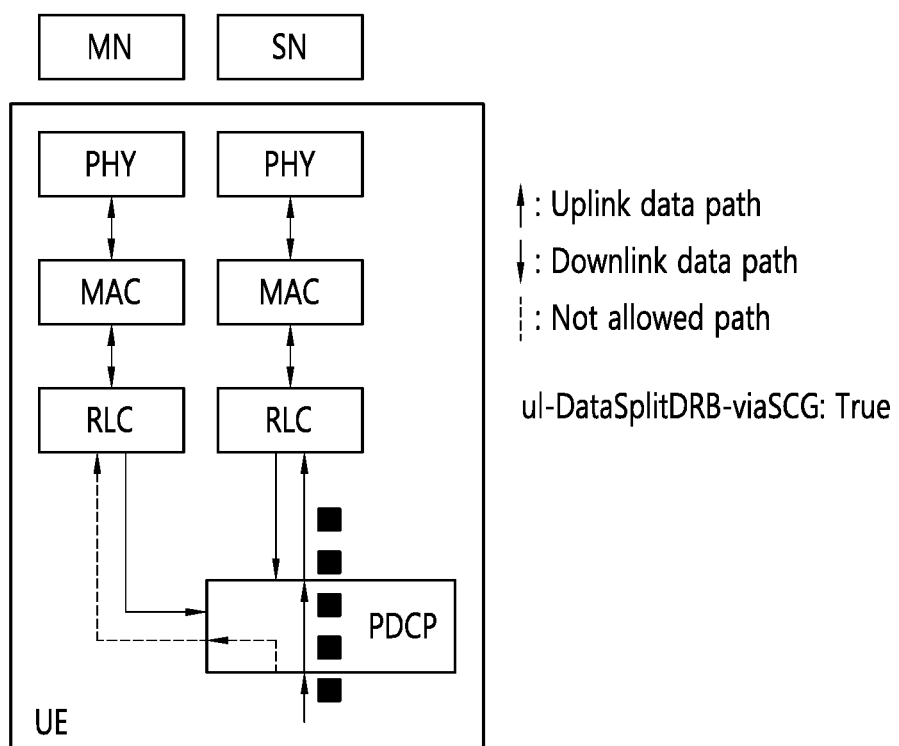

FIG. 9 to FIG. 11 show an example for reconfiguring split bearer(s) to enable uplink data transmission only via the MCG RLC entity according to an embodiment of the present invention.

Referring to FIG. 9, the UE may receive a RRC reconfiguration message configuring split bearer establishment in RRC_CONNECTED. The UE may establish a SCG split bearer with 'UL data split DRB via SCG' set to TRUE. Thus, allowed path for uplink data transmission via split bearer may be a SCG RLC entity.

Then, the UE may receive a RRC connection release message with suspend indication which commands state transition to RRC_INACTIVE via SRB1, and the UE may transit to RRC_INACTCIVE.

Referring to FIG. 10, the UE may autonomously set 'UL data split DRB via SCG' of split bearer to FALSE, and the UE may suspend SCG RLC entity of split bearer. Thus, allowed path for uplink data transmission via split bearer may be a MCG RLC entity. When the uplink data is generated in RRC_INACTIVE and the UE decides to transmit the data without RRC state transition, the UE may submit the PDCP PDU only to the MCG RLC entity.

When the UE decides to resume RRC connection, the UE may initiate a RRC resume procedure. If the RRC resume is permitted by a network, the UE may transit to RRC_CONNECTED.

Referring to FIG. 11, the UE may autonomously restore the previous configuration used in RRC_CONNECTED. That is, the UE may autonomously set 'UL data split DRB via SCG' of split bearer to TRUE. Thus, allowed path for uplink data transmission via split bearer may be the SCG RLC entity.

Hereinafter, an example for reconfiguring split bearer(s) to enable uplink data transmission only via the MCG RLC entity, based on the split threshold and the primary path, according to an embodiment of the present invention.

According to an embodiment of the present invention, the UE may receive a RRC reconfiguration message configuring split bearer establishment in RRC_CONNECTED. The UE may establish SCG split bearer with the primary path set to a SCG RLC entity and the split threshold set to b1600 (i.e. 1600 bytes). Thus, allowed path for uplink data transmission via split bearer may be determined as follows:

If the total amount of PDCP data volume and RLC data volume pending for initial transmission in the two associated RLC entities is less than 1600 bytes, the UE may submit the PDCP Data PDU to the SCG RLC entity.

Else, the UE may submit the PDCP Data PDU to either the MCG RLC entity or the SCG RLC entity.

Then, the UE may receive a RRC connection release message with suspend indication which commands the state transition to RRC_INACTIVE via SRB1, and the UE may transit to RRC_INACTCIVE. If the UE transits to RRC_INACTCIVE, the UE may autonomously set the primary path of split bearer set to the MCG RLC entity, and suspend the SCG RLC entity of split bearer. Thus, allowed path for uplink data transmission via split bearer may be the MCG RLC entity. When the UL data is generated in RRC_INACTIVE and the UE decides to transmit the data without RRC state transition, the UE may submit the PDCP PDU only to the MCG RLC entity.

When the UE decides to resume RRC connection, the UE may initiate a RRC resume procedure. If the RRC resume is permitted by a network, the UE may transit to RRC_CONNECTED.

The UE may maintain the changed value until the UE receives a RRC message for configuring split bearer in RRC_CONNECTED. The split threshold may be b3200 (i.e. 3200 bytes), and the primary path may be the SCG RLC entity. Thus, allowed path for uplink data transmission via split bearer may be determined as follows:

If the total amount of PDCP data volume and RLC data volume pending for initial transmission in the two associated RLC entities is less than 3200 bytes, the UE may submit the PDCP Data PDU to the SCG RLC entity.

Else, the UE may submit the PDCP Data PDU to either the MCG RLC entity or the SCG RLC entity.

Figure 12:
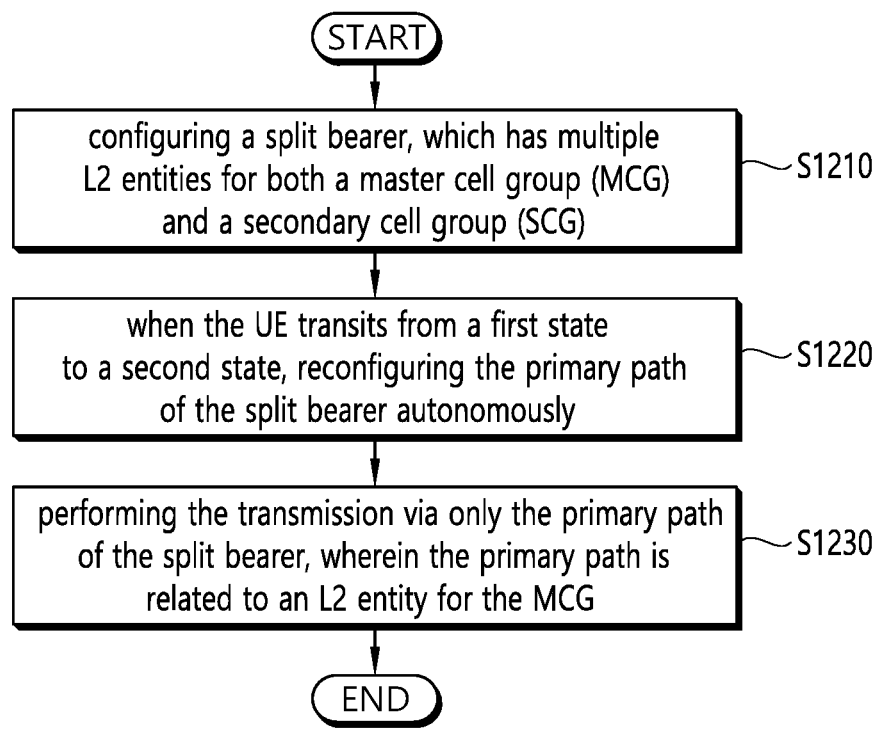
FIG. 12 shows a method for performing transmission via only a primary path by a UE according to an embodiment of the present invention.

FIG. 12 shows a method for performing transmission via only a primary path by a UE according to an embodiment of the present invention. The present invention described above for UE side may be applied to this embodiment.

Referring to FIG. 12, in step S1210, the UE may configure a split bearer, which has multiple L2 entities for both a master cell group (MCG) and a secondary cell group (SCG). The split bearer may be related to a PDCP entity and multiple RLC entities.

In step S1220, when the UE transits from a first state to a second state, the UE may reconfigure the primary path of the split bearer autonomously. For instance, the first state may be a RRC_CONNECTED state, and the second state may be a RRC_INACTIVE state.

In step S1230, the UE may perform the transmission via only the primary path of the split bearer. The primary path may be related to an L2 entity for the MCG. Further, when the UE transits from the first state to the second state, the UE may perform the transmission via only a MCG bearer. On the other hand, the transmission via a SCG bearer may be not performed when the UE transits from the first state to the second state. A configuration related to the SCG may be not released when the UE transits from the first state to the second state.

Further, the UE may receive a message for configuring the split bearer, from a base station (BS). The message may include at least one of a PDCP configuration for a master base station, a PDCP configuration for a secondary base station, a RLC bearer configuration for the MCG, a RLC bearer configuration for the SCG, a threshold for uplink data split, or information on the primary path for uplink data transmission.

Further, the UE may determine to transmit a data in the second state. In this case, an L2 entity of the SCG may be suspended.

According to an embodiment of the present invention, the UE can reconfigure the primary path autonomously so that the uplink transmission can be performed via only the MCG RLC entity without the signalling overhead.

Figure 13:
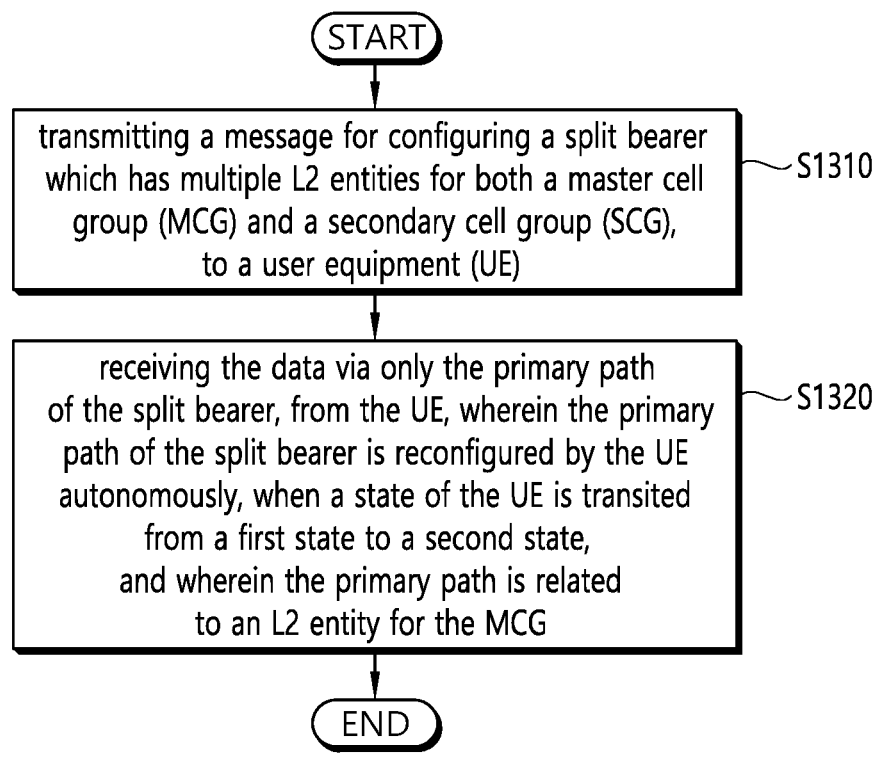
FIG. 13 shows a method for receiving a data via only a primary path by a BS according to an embodiment of the present invention.

FIG. 13 shows a method for receiving a data via only a primary path by a BS according to an embodiment of the present invention. The present invention described above for BS side may be applied to this embodiment.

Referring to FIG. 13, in step S1310, the BS may transmit a message for configuring a split bearer which has multiple L2 entities for both a master cell group (MCG) and a secondary cell group (SCG), to a user equipment (UE).

In step S1320, the BS may receive the data via only the primary path of the split bearer, from the UE. The primary path of the split bearer may be reconfigured by the UE autonomously, when a state of the UE is transited from a first state to a second state. The primary path may be related to an L2 entity for the MCG. A configuration related to the SCG may be not released when the state of the UE is transited from the first state to the second state.

Figure 14:
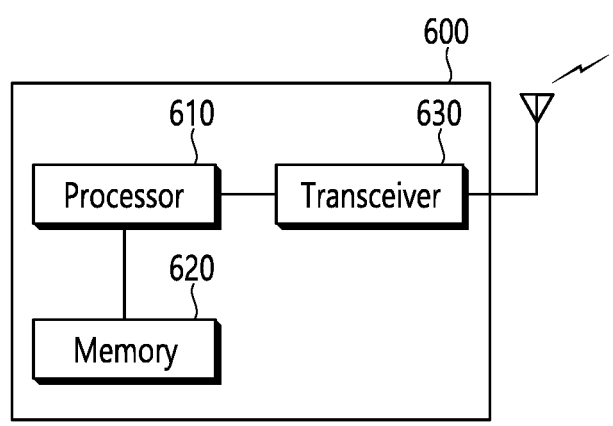
FIG. 14 shows a UE to implement an embodiment of the present invention.

FIG. 14 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610.

Specifically, the processor 610 is configured to configure a split bearer, which has multiple L2 entities for both a master cell group (MCG) and a secondary cell group (SCG). The split bearer may be related to a PDCP entity and multiple RLC entities.

Further, when the UE transits from a first state to a second state, the processor 610 is configured to reconfigure the primary path of the split bearer autonomously. For instance, the first state may be a RRC_CONNECTED state, and the second state may be a RRC_INACTIVE state.

Further, the processor 610 is configured to perform the transmission via only the primary path of the split bearer. The primary path may be related to an L2 entity for the MCG. Further, when the UE transits from the first state to the second state, the processor 610 is configured to perform the transmission via only a MCG bearer. On the other hand, the processor 610 is configured not to perform the transmission via a SCG bearer when the UE transits from the first state to the second state. A configuration related to the SCG may be not released when the UE transits from the first state to the second state.

Further, the processor 610 is configured to control the transceiver 630 to receive a message for configuring the split bearer, from a base station (BS). The message may include at least one of a PDCP configuration for a master base station, a PDCP configuration for a secondary base station, a RLC bearer configuration for the MCG, a RLC bearer configuration for the SCG, a threshold for uplink data split, or information on the primary path for uplink data transmission.

Further, the processor 610 is configured to determine to transmit a data in the second state. In this case, an L2 entity of the SCG may be suspended.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

According to embodiment of the present invention shown in FIG. 14, the UE can reconfigure the primary path autonomously so that the uplink transmission can be performed via only the MCG RLC entity without the signalling overhead.

Figure 15:
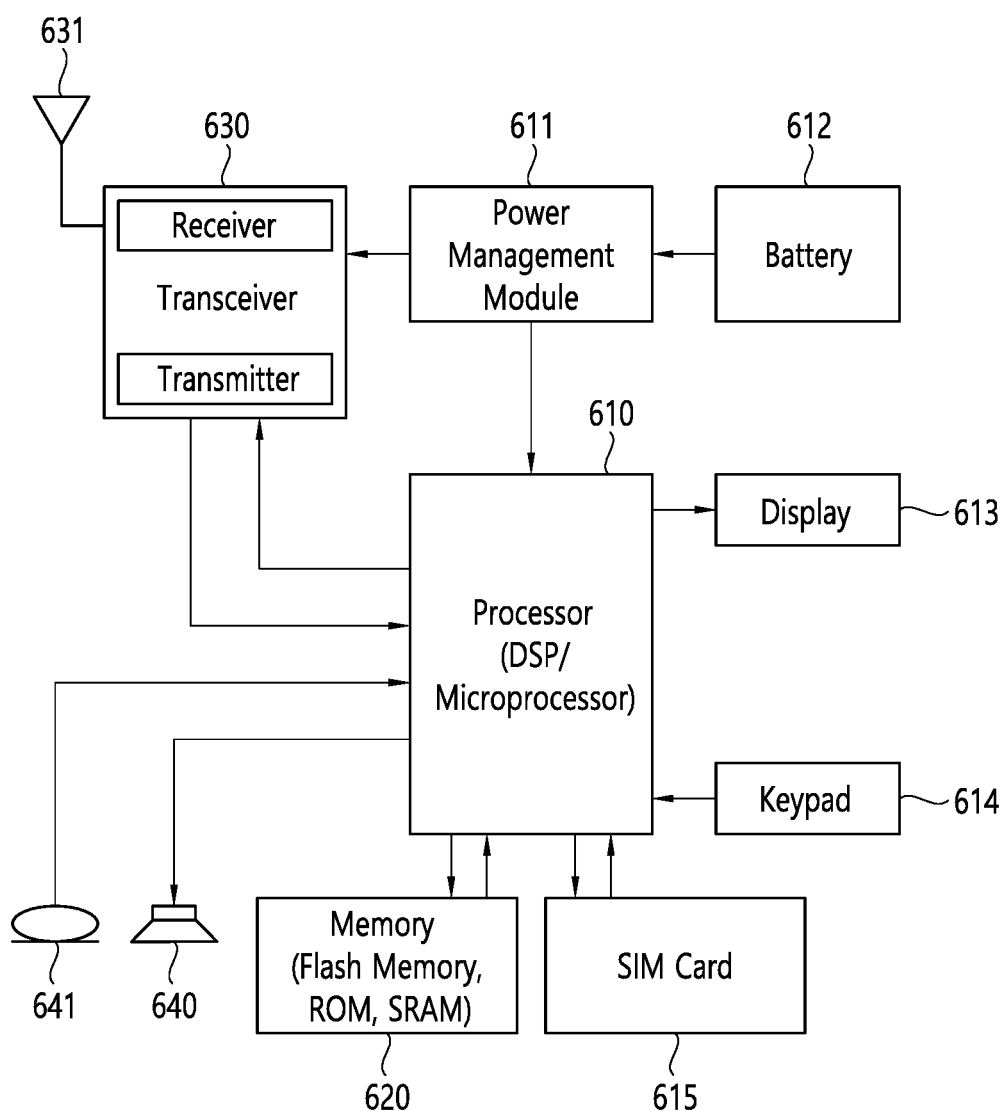
FIG. 15 shows more detailed UE to implement an embodiment of the present invention.

FIG. 15 shows more detailed UE to implement an embodiment of the present invention. The present invention described above for UE side may be applied to this embodiment.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to configure a split bearer, which has multiple L2 entities for both a master cell group (MCG) and a secondary cell group (SCG). The split bearer may be related to a PDCP entity and multiple RLC entities.

Further, when the UE transits from a first state to a second state, the processor 610 is configured to reconfigure the primary path of the split bearer autonomously. For instance, the first state may be a RRC_CONNECTED state, and the second state may be a RRC_INACTIVE state.

Further, the processor 610 is configured to perform the transmission via only the primary path of the split bearer. The primary path may be related to an L2 entity for the MCG. Further, when the UE transits from the first state to the second state, the processor 610 is configured to perform the transmission via only a MCG bearer. On the other hand, the processor 610 is configured not to perform the transmission via a SCG bearer when the UE transits from the first state to the second state. A configuration related to the SCG may be not released when the UE transits from the first state to the second state.

Further, the processor 610 is configured to control the transceiver 630 to receive a message for configuring the split bearer, from a base station (BS). The message may include at least one of a PDCP configuration for a master base station, a PDCP configuration for a secondary base station, a RLC bearer configuration for the MCG, a RLC bearer configuration for the SCG, a threshold for uplink data split, or information on the primary path for uplink data transmission.

Further, the processor 610 is configured to determine to transmit a data in the second state. In this case, an L2 entity of the SCG may be suspended.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiment of the present invention shown in FIG. 15, the UE can reconfigure the primary path autonomously so that the uplink transmission can be performed via only the MCG RLC entity without the signalling overhead.

Figure 16:
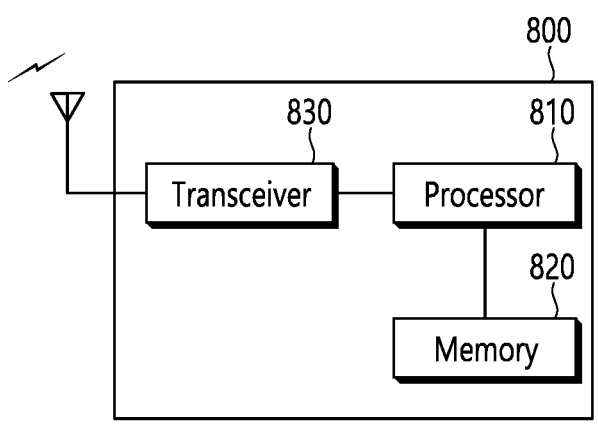
FIG. 16 shows a network node to implement an embodiment of the present invention.

FIG. 16 shows a network node to implement an embodiment of the present invention. The present invention described above for network side may be applied to this embodiment.

A network node 800 includes a processor 810, a memory 820 and a transceiver 830. The processor 810 may be configured to implement proposed functions, procedures and/or methods described in this description. Layers of the radio interface protocol may be implemented in the processor 810.

Specifically, the processor 810 is configured to control the transceiver 830 to transmit a message for configuring a split bearer which has multiple L2 entities for both a master cell group (MCG) and a secondary cell group (SCG), to a user equipment (UE).

Further, the processor 810 is configured to control the transceiver 830 to receive the data via only the primary path of the split bearer, from the UE. The primary path of the split bearer may be reconfigured by the UE autonomously, when a state of the UE is transited from a first state to a second state. The primary path may be related to an L2 entity for the MCG. A configuration related to the SCG may be not released when the state of the UE is transited from the first state to the second state.

The memory 820 is operatively coupled with the processor 810 and stores a variety of information to operate the processor 810. The transceiver 830 is operatively coupled with the processor 810, and transmits and/or receives a radio signal.

The processor 810 may include ASIC, other chipset, logic circuit and/or data processing device. The memory 820 may include ROM, RAM, flash memory, memory card, storage medium and/or other storage device. The transceiver 830 may include baseband circuitry to process radio frequency signals. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

According to embodiment of the present invention shown in FIG. 16, the UE can reconfigure the primary path autonomously so that the uplink transmission can be performed via only the MCG RLC entity without the signalling overhead.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing, by a user equipment (UE), transmission via only a primary path in a wireless communication system, the method comprising:

receiving a message for configuring a split bearer, from a base station (BS), wherein the message includes a packet data convergence protocol (PDCP) configuration for a master BS, a PDCP configuration for a secondary BS, a radio link control (RLC) bearer configuration for a master cell group (MCG), a RLC bearer configuration for a secondary cell group (SCG), a threshold for uplink data split, and information related to the primary path for uplink data transmission, wherein the RLC bearer configuration for the MCG includes RLC and logical channel configurations for the MCG, and wherein the RLC bearer configuration for the SCG includes RLC and logical channel configurations for the SCG;

configuring the split bearer, which has multiple L2 entities for both the MCG and the SCG;

based on a transition of the UE from a first state to a second state, reconfiguring the primary path of the split bearer autonomously; and performing the transmission via only the primary path of the split bearer, wherein the primary path is related to a second layer (L2) entity for the MCG.

2. The method of claim 1, wherein a configuration related to the SCG is not released, based on the transition of the UE from the first state to the second state.

3. The method of claim 1, wherein the first state is a radio resource control (RRC) connected state (RRC CONNECTED), and the second state is a RRC inactive state (RRC INACTIVE).

4. The method of claim 1, further comprising:
based on the transition of the UE from the first state to the second state, setting a parameter, related to whether data split via an SCG is allowed or not, to 'FALSE',
wherein the message includes the parameter related to whether data split via an SCG is allowed or not.

5. The method of claim 4, wherein based on the parameter related to whether data split via an SCG is allowed or not is set to 'FALSE', the transmission is performed via only the primary path of the split bearer.

6. The method of claim 1, further comprising:
determining to transmit a data in the second state.

7. The method of claim 6, wherein an L2 entity of the SCG is suspended.

8. The method of claim 1, further comprising:
based on the transition of the UE from the first state to the second state, performing the transmission via only a MCG bearer.

9. The method of claim 1, wherein the transmission via a SCG bearer is not performed, based on the transition of the UE from the first state to the second state.

10. The method of claim 1, wherein the split bearer is related to a PDCP entity and multiple RLC entities.

11. A method for receiving, by a base station (BS), a data via only a primary path in a wireless communication system, the method comprising:
transmitting a message for configuring a split bearer which has multiple second layer (L2) entities for both a master cell group (MCG) and a secondary cell group (SCG), to a user equipment (UE),
wherein the message includes a packet data convergence protocol (PDCP) configuration for a master BS, a PDCP configuration for a secondary BS, a RLC bearer configuration for a master cell group (MCG), a radio link control (RLC) bearer configuration for a secondary cell group (SCG), a threshold for uplink data split, and information related to the primary path for uplink data transmission, wherein the RLC bearer configuration for the MCG includes RLC and logical channel configurations for the MCG, and wherein the RLC bearer configuration for the SCG includes RLC and logical channel configurations for the SCG; and receiving the data via only the primary path of the split bearer, from the UE, wherein the primary path of the split bearer is reconfigured by the UE autonomously, based on a transition of a state of the UE from a first state to a second state, and wherein the primary path is related to an L2 entity for the MCG.

12. The method of claim 11, wherein a configuration related to the SCG 1s not released, based on the transition of the state of the UE from the first state to the second state.

13. A user equipment for performing transmission via only a primary path, the user equipment comprising:
one or more memories storing instructions;
one or more transceivers; and
one or more processors connected to the one or more memories and the one or more transceivers, wherein the one or more processors execute the instructions to:
receive a message for configuring a split bearer, from a base station (BS),
wherein the message includes a packet data convergence protocol (PDCP) configuration for a master BS, a PDCP configuration for a secondary BS, a radio link control (RLC) bearer configuration for a master cell group (MCG), a RLC bearer configuration for a secondary cell group (SCG), a threshold for uplink data split, and information related to the primary path for uplink data transmission, wherein the RLC bearer configuration for the MCG includes RLC and logical channel configurations for the MCG, and wherein the RLC bearer configuration for the SCG includes RLC and logical channel configurations for the SCG;

configure the split bearer, which has multiple L2 entities for both the MCG and the SCG;

based on a transition of the UE from a first state to a second state, reconfigure the primary path of the split bearer autonomously; and perform the transmission via only the primary path of the split bearer, wherein the primary path is related to a second layer (L2) entity for the MCG.

14. The processor of claim 13, wherein a configuration related to the SCG is not released, based on the transition of the UE from the first state to the second state.

15. The processor of claim 13, wherein the first state is a radio resource control (RRC) connected state (RRC CONNECTED), and the second state is a RRC inactive state (RRC INACTIVE).

* * * * *